(12) United States Patent
Su et al.

(10) Patent No.: US 12,306,505 B2
(45) Date of Patent: May 20, 2025

(54) ARRAY SUBSTRATE COMPRISING FIRST AND SECOND AUXILIARY ELECTRODES, AND DISPLAY DEVICE

(71) Applicants: Beijing BOE Display Technology Co., Ltd., Beijing (CN); BOE Technology Group Co., Ltd., Beijing (CN)

(72) Inventors: Qiujie Su, Beijing (CN); Zhihua Sun, Beijing (CN); Seungmin Lee, Beijing (CN)

(73) Assignees: Beijing BOE Display Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/799,812

(22) PCT Filed: Jul. 6, 2021

(86) PCT No.: PCT/CN2021/104716
§ 371 (c)(1),
(2) Date: Aug. 15, 2022

(87) PCT Pub. No.: WO2022/042050
PCT Pub. Date: Mar. 3, 2022

(65) Prior Publication Data
US 2024/0184173 A1 Jun. 6, 2024

(30) Foreign Application Priority Data
Aug. 27, 2020 (CN) .......................... 202010877133.2

(51) Int. Cl.
*G02F 1/1362* (2006.01)
*G02F 1/1343* (2006.01)
(Continued)

(52) U.S. Cl.
CPC .. *G02F 1/136213* (2013.01); *G02F 1/134372* (2021.01); *G02F 1/13606* (2021.01);
(Continued)

(58) Field of Classification Search
CPC ......... G02F 1/136213; G02F 1/134372; G02F 1/13606; G02F 1/136218
See application file for complete search history.

(56) References Cited

U.S. PATENT DOCUMENTS

2005/0140899 A1 6/2005 Ko
2009/0009672 A1 1/2009 Chung et al.
(Continued)

FOREIGN PATENT DOCUMENTS

CN 101075054 A 11/2007
CN 102236222 A 11/2011
(Continued)

OTHER PUBLICATIONS

CN 202010877133.2 first office action.
PCT/CN2021/104716 international search report and written opinion.

*Primary Examiner* — Paisley L Wilson
(74) *Attorney, Agent, or Firm* — IPro, PLLC

(57) ABSTRACT

An array substrate and a display device are provided. The array substrate includes a base substrate, a plurality of data lines extending along a first direction and a plurality of gate lines extending along a second direction, and a plurality of pixel units defined by the gate lines and the data lines. The pixel unit includes a thin-film transistor, a common electrode and a pixel electrode. The thin-film transistor includes a gate electrode, a source and drain electrode and an active layer. The pixel unit also includes a first auxiliary electrode and a second auxiliary electrode. The first auxiliary electrode is electrically connected to the common electrode, and the second auxiliary electrode is electrically connected to the source and drain electrode. An orthographic projection of the first auxiliary electrode on the base substrate at least partially overlaps an orthographic projection of the second auxiliary electrode on the base substrate.

14 Claims, 15 Drawing Sheets

(51) Int. Cl.
*G02F 1/136* (2006.01)
*G02F 1/1368* (2006.01)

(52) U.S. Cl.
CPC .. *G02F 1/136218* (2021.01); *G02F 1/136286* (2013.01); *G02F 1/1368* (2013.01)

(56) References Cited

U.S. PATENT DOCUMENTS

| | | | |
|---|---|---|---|
| 2010/0033664 | A1 | 2/2010 | Lee |
| 2012/0099041 | A1 | 4/2012 | Xie et al. |
| 2016/0291758 | A1 | 10/2016 | Du et al. |
| 2017/0038654 | A1 | 2/2017 | Cheng et al. |
| 2017/0220148 | A1 | 8/2017 | Zhou et al. |
| 2017/0343873 | A1 | 11/2017 | Ma |
| 2020/0225531 | A1* | 7/2020 | Lee ................ G02F 1/136227 |

FOREIGN PATENT DOCUMENTS

| | | |
|---|---|---|
| CN | 104570530 A | 4/2015 |
| CN | 104699316 A | 6/2015 |
| CN | 204422935 U | 6/2015 |
| CN | 106855670 A | 6/2017 |
| CN | 108803173 A | 11/2018 |
| CN | 105977261 B | 1/2019 |
| CN | 111965908 A | 11/2020 |
| IN | 101644864 A | 2/2010 |

* cited by examiner

ARRAY SUBSTRATE COMPRISING FIRST AND SECOND AUXILIARY ELECTRODES, AND DISPLAY DEVICE

CROSS-REFERENCE TO RELATED APPLICATION

The present is the U.S. national phase of PCT Application PCT/CN2021/104716 filed on Jul. 6, 2021, which claims the benefit of priority of Chinese Patent Application No. 202010877133.2, filed in China on Aug. 27, 2020, which is incorporated herein by reference in its entirety.

TECHNICAL FIELD

The present disclosure relates to liquid crystal display technical field, and in particular to an array substrate and a display device.

BACKGROUND

In recent years, with the development of science and technology and the improvement of living standards, people's demand for display devices is higher and higher, which shows that the products are gradually developing to the direction with large size and high resolution. The area of single pixel in display device is decreasing, the ratio of parasitic capacitance in a pixel unit is larger than that in a storage capacitor, and the parasitic capacitance becomes indispensable. The increase of parasitic capacitance may cause poor display such as cross-striation, afterimage and Crosstalk.

Therefore, in order to ensure the display quality, it is necessary to increase the storage capacitor to reduce the adverse effect caused by the parasitic capacitance.

SUMMARY

The present disclosure is to provide an array substrate and a display device.

At least one embodiment of the present disclosure provides an array substrate comprising a base substrate;
  a plurality of data lines extending along a first direction and a plurality of gate line extending along a second direction, and a plurality of pixel units defined by the gate line and the data line; the pixel unit includes a thin-film transistor, a common electrode, and a pixel electrode, and the thin-film transistor includes a gate electrode, a source and drain electrode, and an active layer, wherein the pixel electrode and an adjacent gate line have gap region in the first direction.

The pixel unit further comprises a first auxiliary electrode and a second auxiliary electrode, wherein the first auxiliary electrode is electrically connected to the common electrode, and the second auxiliary electrode is electrically connected to the source and drain electrode; the orthographic projection of the first auxiliary electrode on the base substrate at least partially overlaps the orthographic projection of the second auxiliary electrode on the base substrate, and the first auxiliary electrode is located within the gap region.

Optionally, the pixel unit has a non-opening region and an opening region, and the gap region is located within the non-opening region.

Optionally, the first auxiliary electrode is a metal electrode and is arranged in the same layer as the gate electrode.

Optionally, the first auxiliary electrode and the adjacent gate line have a first interval in the first direction; the first auxiliary electrode and the adjacent pixel electrode have a second interval in the first direction; the first interval is greater than the second interval.

Optionally, the length of the first auxiliary electrode and the second auxiliary electrode in the second direction is equal to the length of the pixel electrode in the second direction.

Optionally, the length of the first auxiliary electrode in the first direction is greater than one-third of the length of the gate line in the first direction and less than one-half of the length of the gate line in the first direction.

Optionally, the gap region comprises a first gap region and a second gap region; the gap region of the pixel electrode and the gate line of the thin-film transistor electrically connected thereto in the first direction is the first gap region; the gap region of the pixel electrode and the gate line of the next row of pixel units in the first direction is the second gap region.

Optionally, the first auxiliary electrode is arranged in the first gap region, and the second auxiliary electrode is arranged in the same layer as the source and drain electrode and is directly connected to the source and drain electrode.

Optionally, the array substrate further comprises a gate insulating layer and a passivation layer; the gate electrode is arranged on the base substrate; the gate insulating layer is arranged on the side of the gate electrode away from the base substrate; the active layer is arranged on the side of the gate insulating layer away from the base substrate; the source and drain electrode is arranged on the side of the active layer away from the base substrate; the passivation layer is located on the side of the source and drain electrode away from the base substrate; the common electrode is arranged on the base substrate and the pixel electrode is arranged on the side of the passivation layer away from the base substrate.

the array substrate further comprises a gate insulating layer and a passivation layer; the gate electrode is arranged on the base substrate; the gate insulating layer is arranged on the side of the gate electrode away from the base substrate; the active layer is arranged on the side of the gate insulating layer away from the base substrate; the source and drain electrode is arranged on the side of the active layer away from the base substrate; the passivation layer is located on the side of the source and drain electrode away from the base substrate; the pixel electrode is arranged on the base substrate and the common electrode is arranged on the side of the passivation layer away from the base substrate.

Optionally, the array substrate further comprises a gate insulating layer and a passivation layer; the gate electrode is arranged on the base substrate; the gate insulating layer is arranged on the side of the gate electrode away from the base substrate; the active layer is arranged on the side of the gate insulating layer away from the base substrate; the source and drain electrode is arranged on the side of the active layer away from the base substrate; the passivation layer is located on the side of the source and drain electrode away from the base substrate; the pixel electrode is arranged on the side of the gate insulating layer away from the base substrate and the common electrode is arranged on the side of the passivation layer away from the base substrate.

Optionally, the first auxiliary electrode is arranged in the second gap region, and the second auxiliary electrode is arranged in the same layer as the pixel electrode and is directly connected to the pixel electrode.

Optionally, the array substrate further comprises a gate insulating layer and a passivation layer; the gate electrode is arranged on the base substrate; the gate insulating layer is arranged on the side of the gate electrode away from the base substrate; the active layer is arranged on the side of the gate insulating layer away from the base substrate; the source and drain electrode is arranged on the side of the active layer away from the base substrate; the passivation layer is located on the side of the source and drain electrode away from the base substrate; the common electrode is arranged on the base substrate and the pixel electrode is arranged on the side of the passivation layer away from the base substrate.

Optionally, the array substrate further comprises a gate insulating layer and a passivation layer; the gate electrode is arranged on the base substrate; the gate insulating layer is arranged on the side of the gate electrode away from the base substrate; the active layer is arranged on the side of the gate insulating layer away from the base substrate; the source and drain electrode is arranged on the side of the active layer away from the base substrate; the passivation layer is located on the side of the source and drain electrode away from the base substrate; the pixel electrode is arranged on the side of the gate insulating layer away from the base substrate and the common electrode is arranged on the side of the passivation layer away from the base substrate.

Optionally, the first auxiliary electrodes of the same row of pixel units are connected along the second direction into one wiring, and the wiring is multiplexed into a common electrode line.

Optionally, the first auxiliary electrode comprises a first electrode and a second electrode, the second auxiliary electrode comprises a third electrode and a fourth electrode, the first electrode and the third electrode are arranged in the first gap region, and the second electrode and the fourth electrode are arranged in the second gap region.

The present disclosure also provides a display device, the display device further including a counter substrate arranged opposite the array substrate and a liquid crystal arranged between the array substrate and the counter substrate.

BRIEF DESCRIPTION OF THE DRAWINGS

In order to more clearly illustrate the technical solution of the embodiment of the present disclosure, a brief description will now be given of the drawings of the embodiment, it being obvious that the drawings in the following description relate only to some of the embodiment of the present disclosure and do not limit the present disclosure.

REFERENCE NUMERALS

1—Base substrate; 2—Gate electrode/Gate line; 3—Common electrode;
4—Gate insulating layer; 5—Active layer; 7—Source and drain electrode;
8—Passivation layer; 9—Pixel electrode; 10—First through hole;
11—First auxiliary electrode; 12—Second auxiliary electrode; 13—Data line;
20—Pixel unit; 21—First gap region; 22—Second gap region;
23—Non-opening region; 100—Array substrate; 111—First electrode;
112—Second electrode; 123—Third electrode; 124—Fourth electrode;
200—Counter substrate; 300—Liquid crystal.

DETAILED DESCRIPTION

For the purpose of clarifying the objects, technical solution and advantages of the embodiment of the present disclosure, a clear and complete description of the technical solution of the embodiment of the present disclosure will be provided in connection with the accompanying drawings of the embodiment of the present disclosure. It is evident that the described embodiments are part of the embodiments of the present disclosure, not all embodiments. Based on the described embodiments of the present disclosure, all other embodiments obtained by a person of ordinary skill in the art without inventive effort are range of the present disclosure.

Unless defined otherwise, technical or scientific terms used herein shall have the ordinary meaning as understood by one of ordinary skill in the art to which the present disclosure belongs. The use of "first", "second" and the like in this disclosure does not denote any order, quantity, or importance, but rather is used to distinguish one element from another. Similarly, the word "includes" or "comprises", and the like, means that the presence of an element or an item preceding the word encompasses the presence of the listed element or item following the word and its equivalents, without excluding other elements or items. "Linked" or "connected" and the like are not limited to physical or mechanical connections, but may include electrical connections, whether direct or indirect. The terms "upper", "lower", "left", "right", etc. are used only to indicate a relative position relationship, which may change accordingly when the absolute position of the object being described changes.

Figure 1A:
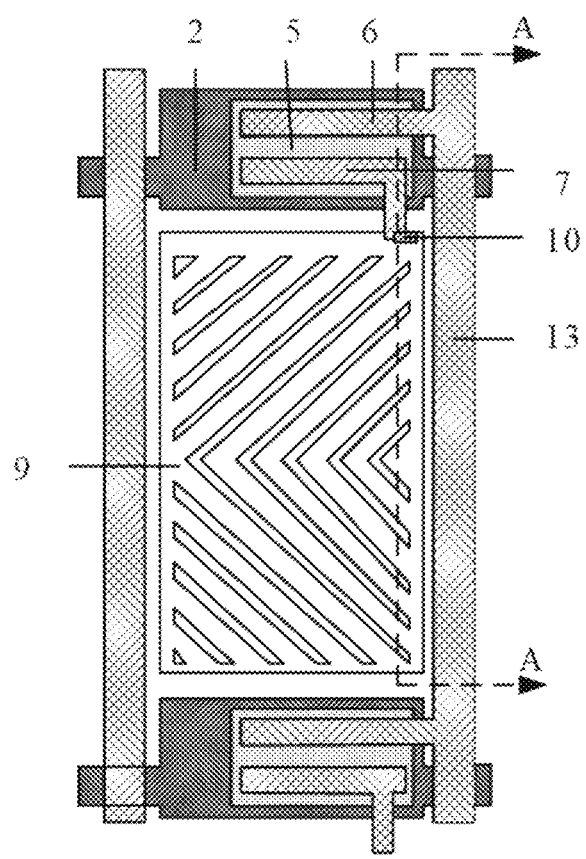
FIG. 1A is a partial schematic top view of a prior art of an array substrate.
Figure 1B:
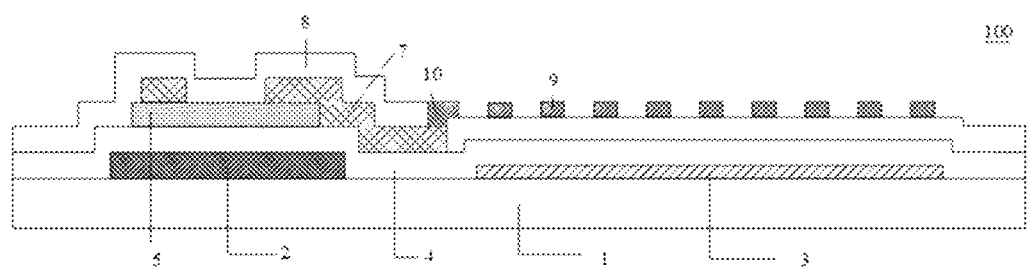
FIG. 1B is a schematic cross-sectional view taken along the line A-A of FIG. 1A.

FIG. 1A is a partial schematic top view of a prior art of an array substrate 100, and FIG. 1B is a cross-sectional view taken along the line A-A of FIG. 1A. As shown in FIGS. 1A and 1B, the storage capacitor in the array substrate 100 is generated by the pixel electrode 9 and the common electrode 3, the overlapping area between the pixel electrode 9 and the common electrode 3 is limited, and the interval between the two is large, which is the sum of the thicknesses of the gate insulating layer 4 and the passivation layer 8, and thus the size of the generated storage capacitor is limited, which easily causes a poor display problem.

Embodiment 1

Figure 2:
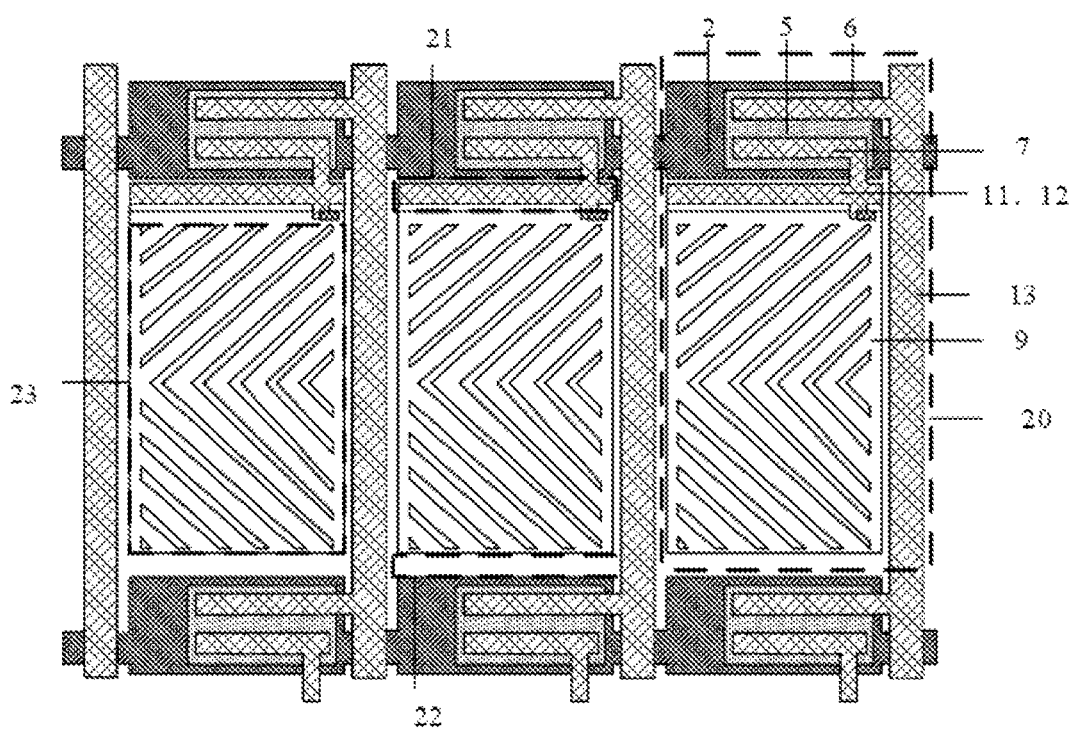
FIG. 2 is a schematic pixel unit diagram of an array substrate of embodiment 1 of the present disclosure.
Figure 3A:
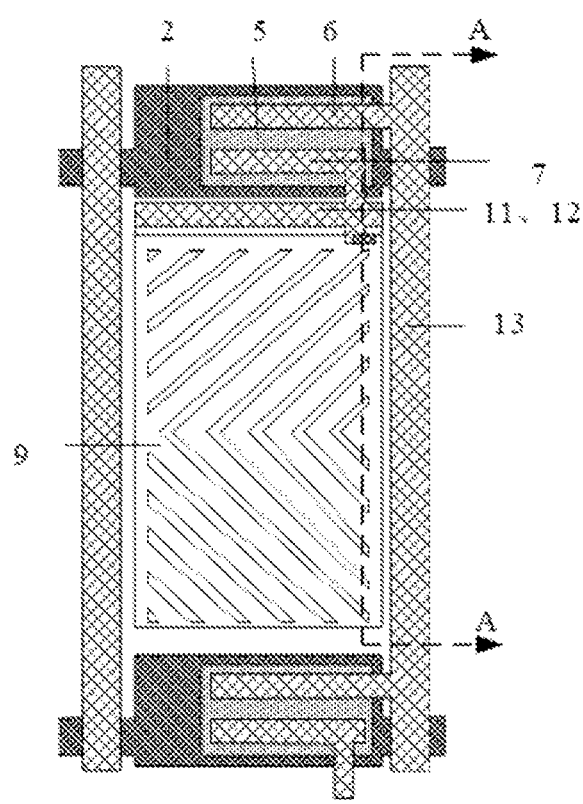
FIG. 3A is a partial schematic top view of an array substrate of embodiment 1 of the present disclosure.
Figure 3B:
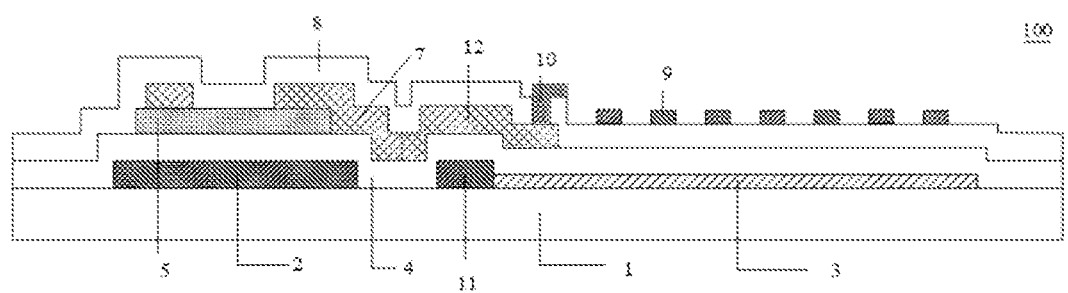
FIG. 3B is a schematic cross-sectional view taken along the line A-A of FIG. 3A.

The present embodiment provides an array substrate 100. FIG. 2 is a schematic diagram of a pixel unit of the array substrate 100 of the embodiment 1 of the present disclosure, FIG. 3A is a partial schematic top view of the array substrate 100 of the embodiment 1 of the present disclosure, and FIG. 3B is a schematic cross-sectional diagram taken along the line A-A in FIG. 3A.

The array substrate 100 comprises a base substrate, and a plurality of data lines 13 extending along a first direction and a plurality of gate lines 2 extending along a second direction, wherein the data line 13 and the gate line 2 define a plurality of pixel units, and a dashed box 20 in FIG. 2 represents one pixel unit. Within each pixel unit 13 is provided a thin-film transistor (not shown in its entirety), a common electrode and a pixel electrode. Each pixel unit can be divided into an opening region and a non-opening region (not shown in the figure) as shown by a dashed box 23 in FIG. 2, wherein the color film substrate opposite to the array substrate 100 in the non-opening region is provided with a black matrix, and light cannot transmit through the non-opening region; and the color film substrate opposite to the array substrate 100 in the opening region 23 has no black matrix, and light can transmit through the opening region 23. The thin-film transistor is located in the non-opening region and includes a gate electrode 2, a source and drain electrode 7, and an active layer 5. The pixel electrode 9 and the common electrode 3 may all be located in the opening region 23, or most of the pixel electrode 9 and the common electrode 3 may be located in the opening region 23, and the edge portion may be located in the non-opening region.

The pixel unit 20 further comprises a first auxiliary electrode 11 and a second auxiliary electrode 12, wherein the first auxiliary electrode 11 is electrically connected to the common electrode 3, and the second auxiliary electrode 12 is electrically connected to the source and drain electrode 7, and the orthographic projection of the first auxiliary electrode 11 on the base substrate 1 at least partially overlaps the orthographic projection of the second auxiliary electrode on the base substrate 1, so that an auxiliary storage capacitor can be generated between the overlapping portions of the first auxiliary electrode 11 and the second auxiliary electrode 12. At the same time, the first auxiliary electrode 11 is electrically connected to the common electrode 3, and the electrical connection between the first auxiliary electrode 11 and the common electrode 3 can be either a direct contact connection between the first auxiliary electrode 11 and the common electrode 3 or a connection between the first auxiliary electrode 11 and the common electrode via a through hole. The electrical connection between the second auxiliary electrode 12 and the source and drain electrode 7 may be either a direct contact connection between the second auxiliary electrode 12 and the source and drain electrode 7 or a connection between the second auxiliary electrode 12 and the source and drain electrode via the pixel electrode 9. Therefore, the generated auxiliary storage capacitor can compensate for the storage capacitor generated by the common electrode and the pixel electrode, increasing the total storage capacitor, and improving the poor display caused by parasitic capacitance.

Furthermore, the orthographic projection of the second auxiliary electrode 12 on base substrate 1 can completely overlap the orthographic projection of the first auxiliary electrode 11 on base substrate 1, so that the overlapping area of the two orthographic projections can be maximized, resulting in a larger auxiliary storage capacitor.

The first auxiliary electrode 11 is a metal material, consists of the same metal material as the gate electrode 2, and is arranged in the same layer as the gate electrode 2. The same layer arrangement described in the present disclosure is not limited to both belonging to the same film layer height, but it should be understood that both may be formed by the same patterning process. Providing the first auxiliary electrode 11 and the gate electrode 2 in the same layer can simplify the process, save costs, improve manufacturing efficiency and reduce costs without adding an additional process step. At the same time, since the first auxiliary electrode 11 is a metal material and is electrically connected to the common electrode 3, which is equivalent to connecting a metal resistance to the common electrode in parallel, the resistance of the common electrode can be greatly reduced, and thus the power consumption can be reduced and energy resources can be saved.

The pixel electrode 9 has a gap region in the first direction with the adjacent gate line 2, wherein the gap region of the pixel electrode 9 and the gate line of the thin-film transistor electrically connected thereto in the first direction is the first gap region 21; the gap region of the pixel electrode 9 and the gate line of the next row of pixel units in the first direction is the second gap region 22. The gap region is located in the non-opening region. Since the first auxiliary electrode is an opaque metal material, in order not to affect the transmittance of the array substrate 100, the first auxiliary electrode 11 and the second auxiliary electrode 12 are arranged in the gap region, the gap region being located in a non-opening region, and the region cannot transmit light due to the barrier of the black matrix, so that the storage capacitor can be increased without affecting the opening rate of the array substrate 100.

Since the first auxiliary electrode 11 is a conductive metal material, in order to make the first auxiliary electrode 11 not affect the normal operation of the gate line 2 and prevent the first auxiliary electrode 11 from being short-circuited with the gate line 2, the first auxiliary electrode 11 and the gate line 2 are insulated. The first auxiliary electrode 11 and the adjacent gate line 2 have a first interval d1 in the first direction, the first auxiliary electrode 11 and the adjacent pixel electrode 9 have a second interval d2 in the first direction, and the first interval d1 is greater than the second interval d2. The second interval d2 can be a zero or a negative value, and when the second interval is a negative value, it indicates that there is an overlapping part between the first auxiliary electrode 11 and the orthographic projection of the adjacent pixel electrode 2 on the base substrate 1.

The size and shape of the first auxiliary electrode 11 and the second auxiliary electrode 12 are not particularly limited, and in order to use the area of the gap region in the non-opening area as much as possible, increasing the storage capacitor and reducing the common electrode resistance, it is preferable to set the first auxiliary electrode 11 and the second auxiliary electrode 12 as a rectangle parallel to the gate line 2, and the length of the first auxiliary electrode 11 and the second auxiliary electrode 12 in the second direction is equal to the length of the pixel electrode 9 in the second direction; the length of the first auxiliary electrode 11 in the first direction is greater than one-third of the length of the gate line 2 in the first direction and less than one-half of the length of the gate line 2 in the first direction.

As shown in FIGS. 3A and 3B, the first auxiliary electrode 11 is arranged in the first gap region 21, and the second auxiliary electrode is arranged in the same layer as the source and drain electrode 7 and is directly connected to the source and drain electrode. The array substrate 100 further comprises a gate insulating layer 4 and a passivation layer 8; the gate electrode 2 is arranged on the base substrate 1; the gate insulating layer 4 is arranged on the side of the gate electrode 2 away from the base substrate 1; the active layer 6 is arranged on the side of the gate insulating layer 4 away from the base substrate 1; the source and drain electrode 7 is arranged on the side of the active layer 5 away from the base substrate; the passivation layer 8 is located on the side of the source and drain electrode 7 away from the base substrate; the common electrode 3 is arranged on the base substrate 1, the common electrode 3 is directly connected to the first auxiliary electrode 11, the pixel electrode 9 is arranged on the side of the passivation layer 8 away from the base substrate 1, and the pixel electrode 9 is connected to the second auxiliary electrode 12 via the first through hole 10.

The pixel electrode 9 may be a slit electrode, the direction of the slit is not particularly limited, and the direction of the slit may be along the first direction, the second direction or at an angle to the first direction.

Embodiment 2

Figure 4A:
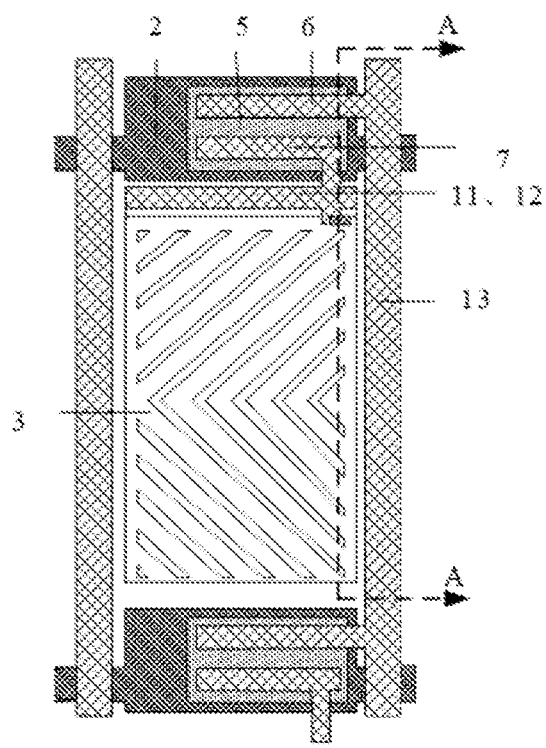
FIG. 4A is a partial schematic top view of an array substrate of embodiment 2 of the present disclosure.

The present embodiment provides an array substrate 100. FIG. 4A is a schematic partial top view of an array substrate 100 of the embodiment 2 of the present disclosure, and FIG. 4B is a schematic cross-sectional view taken along the line A-A of FIG. 4A.

Figure 4B:
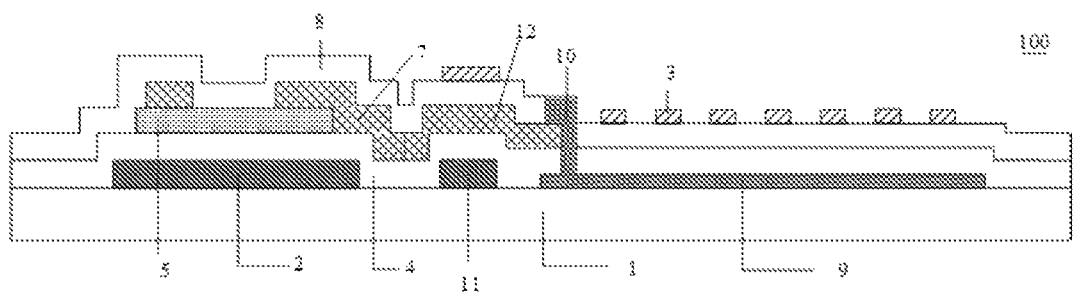
FIG. 4B is a schematic cross-sectional view taken along the line A-A of FIG. 4A.

As shown in FIGS. 4A and 4B, the first auxiliary electrode 11 is arranged in the first gap region 21, and the second auxiliary electrode is arranged in the same layer as the source and drain electrode 7 and is directly connected to the source and drain electrode. The array substrate 100 further comprises a gate insulating layer 4 and a passivation layer 8; the gate electrode 2 is arranged on the base substrate 1; the gate insulating layer 4 is arranged on the side of the gate electrode 2 away from the base substrate 1; the active layer 6 is arranged on the side of the gate insulating layer 4 away from the base substrate 1; the source and drain electrode 7 is arranged on the side of the active layer 5 away from the base substrate; the passivation layer 8 is located on the side of the source and drain electrode 7 away from the base substrate; the pixel electrode 9 is arranged on the base substrate 1, the common electrode 3 is arranged on the side of the passivation layer 8 away from the base substrate 1, and the pixel electrode 9 is connected to the second auxiliary electrode 12 via the first through hole 10.

The present embodiment differs from the embodiment 1 in that the pixel electrode 9 is arranged on the base substrate 1, the common electrode 3 is arranged on the side of the passivation layer 8 away from the base substrate 1, the common electrode 3 may further comprise an extension part, and the extension part at least partially overlaps with the orthographic projection of the second auxiliary electrode 12 on the base substrate. The technical solution can be simply implemented by appropriately changing the number of through holes and the position, for example, the common electrode 3 and the first auxiliary electrode 11 can be connected via a second through hole (not shown). In addition to increasing the auxiliary storage capacitor between the first auxiliary electrode 11 and the second auxiliary electrode, the present embodiment can also increase the capacitance between the extension part of the common electrode 3 and the second auxiliary electrode, further increasing the total storage capacitor can better improve the poor display problem.

Embodiment 3

Figure 5A:
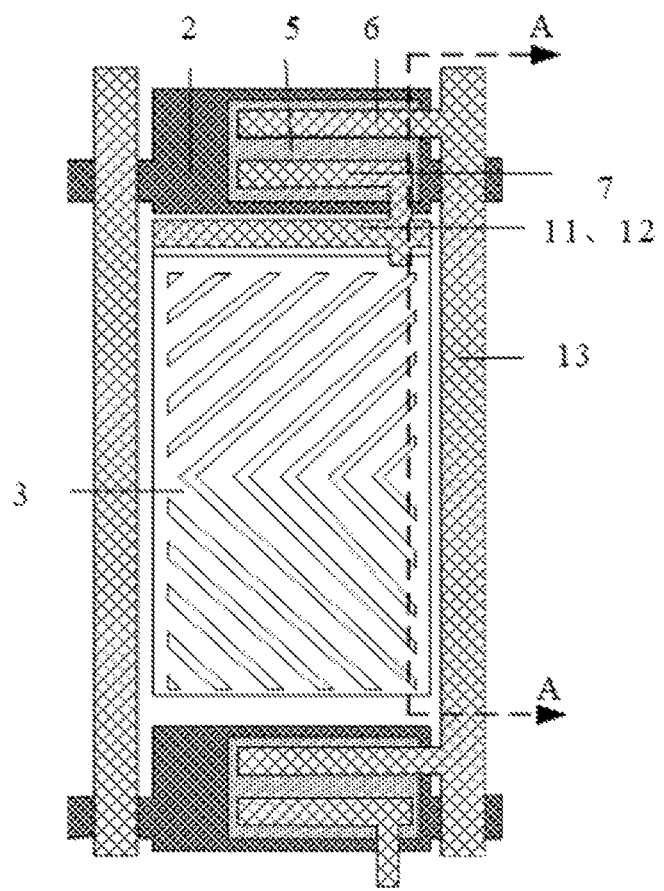
FIG. 5A is a partial schematic top view of an array substrate of embodiment 3 of the present disclosure.
Figure 5B:
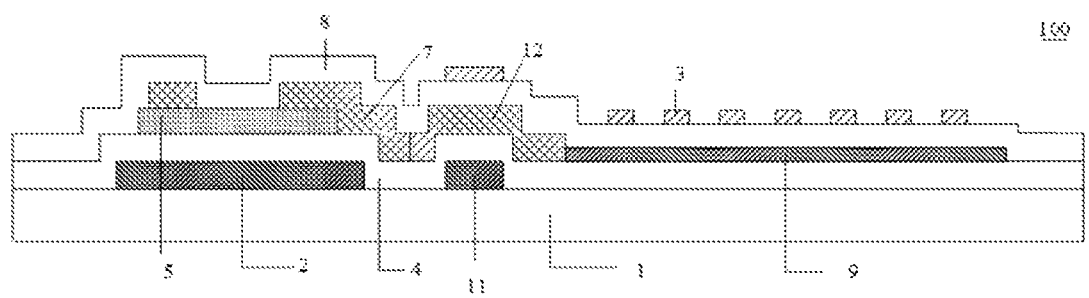
FIG. 5B is a schematic cross-sectional view taken along the line A-A of FIG. 5A.

The present embodiment provides an array substrate 100. FIG. 5A is a partial schematic top view of an array substrate 100 of embodiment 3 of the present disclosure, and FIG. 5B is a schematic cross-sectional view taken along the line A-A of FIG. 5A.

The first auxiliary electrode 11 is arranged in the first gap region 21, and the second auxiliary electrode is arranged in the same layer as the source and drain electrode 7 and is directly connected to the source and drain electrode. The array substrate 100 further comprises a gate insulating layer 4 and a passivation layer 8; the gate electrode 2 is arranged on the base substrate 1; the gate insulating layer 4 is arranged on the side of the gate electrode 2 away from the base substrate 1; the active layer 6 is arranged on the side of the gate insulating layer 4 away from the base substrate 1; the source and drain electrode 7 is arranged on the side of the active layer 5 away from the base substrate; the passivation layer 8 is located on the side of the source and drain electrode 7 away from the base substrate; the pixel electrode 9 is arranged on the side of the gate insulating layer 4 away from the base substrate 1, the common electrode 3 is arranged on the side of the passivation layer 8 away from the base substrate 1, and the pixel electrode 9 is directly connected to the second auxiliary electrode 12.

The present embodiment differs from embodiment 1 in that the pixel electrode 9 is arranged on the side of the gate insulating layer 4 away from the base substrate 1, the common electrode 3 is arranged on the side of the passivation layer 8 away from the base substrate 1, the pixel electrode 9 is directly connected to the second auxiliary electrode 12, and the common electrode 3 may further comprise an extension part, and the extension part at least partially overlaps with the orthographic projection on the base substrate with the second auxiliary electrode 12. The technical solution can be simply implemented by appropriately changing the number of through holes and the position, for example, the common electrode 3 and the first auxiliary electrode 11 can be connected via a second through hole (not shown). In addition to increasing the auxiliary storage capacitor between the first auxiliary electrode 11 and the second auxiliary electrode, the present embodiment can also increase the capacitance between the extension part of the common electrode 3 and the second auxiliary electrode, further increasing the total storage capacitor can better improve the poor display problem. The direct connection of the pixel electrode 9 to the second auxiliary electrode 12 without the need for a through hole simplifies the process and saves costs.

Embodiment 4

Figure 6A:
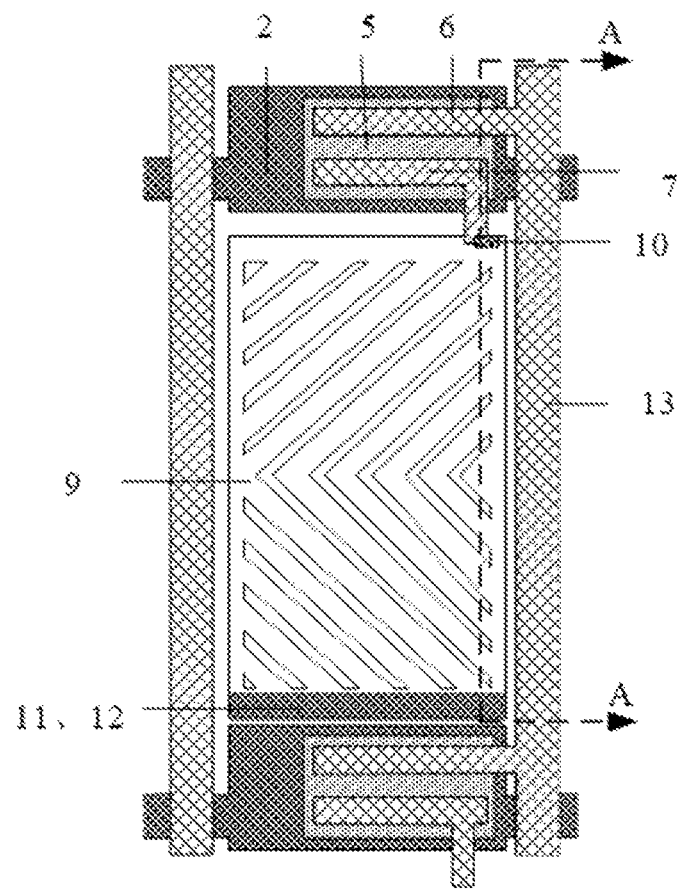
FIG. 6A is a partial schematic top view of an array substrate of embodiment 4 of the present disclosure.

The present embodiment provides an array substrate 100. FIG. 6A is a partial schematic top view of an array substrate 100 of the embodiment 4 of the present disclosure, and FIG. 6B is a schematic cross-sectional view taken along the line A-A of FIG. 6A.

Figure 6B:
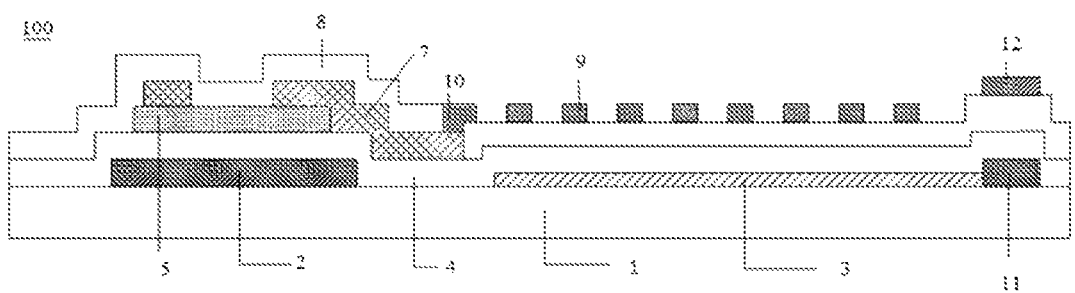
FIG. 6B is a schematic cross-sectional view taken along the line A-A of FIG. 6A.

As shown in FIGS. 6A and 6B, the first auxiliary electrode 11 is arranged in the second gap region 22, and the second auxiliary electrode is arranged in the same layer as the pixel electrode 9 and is directly connected to the pixel electrode 9. The array substrate 100 further comprises a gate insulating layer 4 and a passivation layer 8; the gate electrode 2 is arranged on the base substrate 1; the gate insulating layer 4 is arranged on the side of the gate electrode 2 away from the base substrate 1; the active layer 6 is arranged on the side of the gate insulating layer 4 away from the base substrate 1; the source and drain electrode 7 is arranged on the side of the active layer 5 away from the base substrate; the passivation layer 8 is located on the side of the source and drain electrode 7 away from the base substrate; the common electrode 3 is arranged on the base substrate 1, the common electrode 3 is directly connected to the first auxiliary electrode 11, the pixel electrode 9 is arranged on the side of the passivation layer 8 away from the base substrate 1, and the pixel electrode 9 is connected to the source and drain electrode 7 via the first through hole 10.

The present embodiment differs from embodiment 1 in that a first auxiliary electrode 11 is arranged in a second gap region 22, and the second auxiliary electrode is arranged in the same layer as the pixel electrode 9 and is directly connected to the pixel electrode 9. Furthermore, the first auxiliary electrode 11 of the same row of pixel unit is connected along a second direction to form a wiring, and the wiring can be multiplexed as a common electrode line, and the wiring setting on the array substrate 100 can be saved while increasing the storage capacitor.

Embodiment 5

Figure 7A:
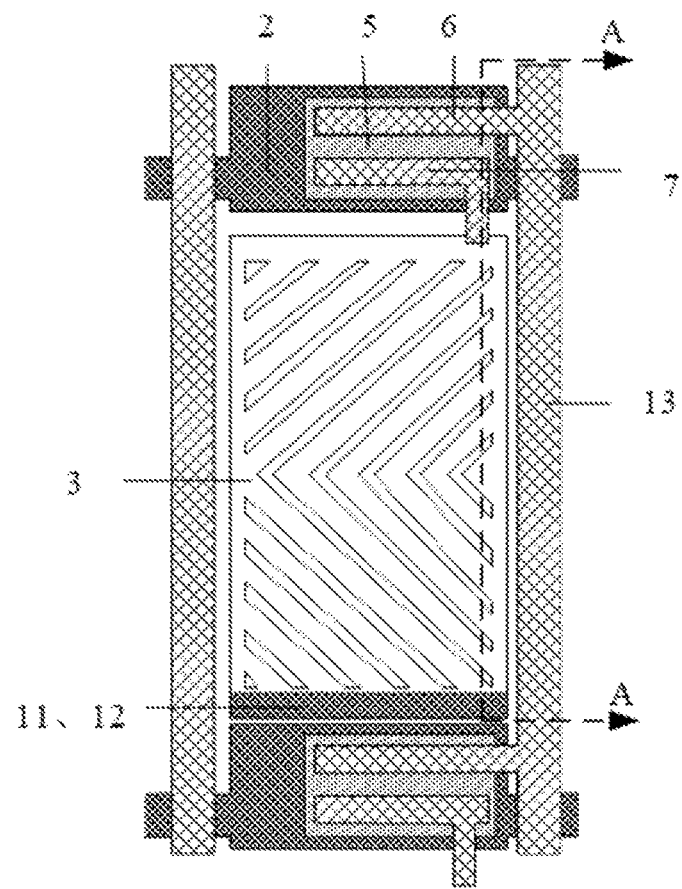
FIG. 7A is a partial schematic top view of an array substrate of embodiment 5 of the present disclosure.

The present embodiment provides an array substrate 100. FIG. 7A is a partial schematic top view of an array substrate 100 of the embodiment 5 of the present disclosure, and FIG. 7B is a schematic cross-sectional view taken along the line A-A of FIG. 7A.

Figure 7B:
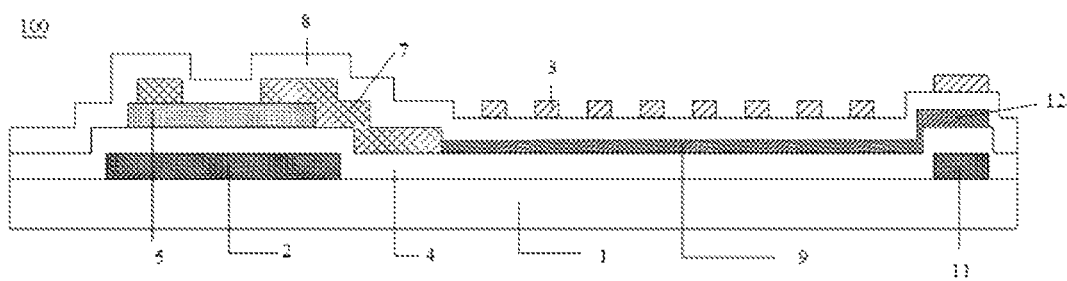
FIG. 7B is a schematic cross-sectional view taken along the line A-A of FIG. 7A.

As shown in FIGS. 7A and 7B, the first auxiliary electrode 11 is arranged in the second gap region 22, and the second auxiliary electrode is arranged in the same layer as the pixel electrode 9 and is directly connected to the pixel electrode 9. The array substrate 100 further comprises a gate insulating layer 4 and a passivation layer 8; the gate electrode 2 is arranged on the base substrate 1; the gate insulating layer 4 is arranged on the side of the gate electrode 2 away from the base substrate 1; the active layer 6 is arranged on the side of the gate insulating layer 4 away from the base substrate 1; the source and drain electrode 7 is arranged on the side of the active layer 5 away from the base substrate; the passivation layer 8 is located on the side of the source and drain electrode 7 away from the base substrate; the pixel electrode 9 is arranged on the side of the gate insulating layer 4 away from the base substrate 1, and the pixel electrode 9 is connected to the source and drain electrode 7, and the common electrode 3 is arranged on the side of the passivation layer 8 away from the base substrate 1, and is directly connected to the first auxiliary electrode 11.

The present embodiment differs from embodiment 1 in that a first auxiliary electrode 11 is arranged in a second gap region 22, and the second auxiliary electrode is arranged in the same layer as the pixel electrode 9 and is directly connected to the pixel electrode 9. The pixel electrode 9 is arranged on the side of the gate insulating layer 4 away from the base substrate 1, the common electrode 3 is arranged on the side of the passivation layer 8 away from the base substrate 1, and the pixel electrode 9 is directly connected to the source and drain electrode 7; the common electrode 3 may further comprise an extension part, the extension part at least partially overlapping the orthographic projection on the base substrate with the second auxiliary electrode 12. The technical solution can be simply implemented by appropriately changing the number of through holes and the position, for example, the common electrode 3 and the first auxiliary electrode 11 can be connected via a second through hole (not shown). In addition to increasing the auxiliary storage capacitor between the first auxiliary electrode 11 and the second auxiliary electrode, the present embodiment can also increase the capacitance between the extension part of the common electrode 3 and the second auxiliary electrode, further increasing the total storage capacitor can better improve the poor display problem. Direct connection of pixel electrode 9 to source and drain electrode 7 without the need for a through hole simplifies the process and saves costs. Furthermore, the first auxiliary electrode 11 of the same row of pixel unit is connected along a second direction to form a wiring, and the wiring can be multiplexed as a common electrode line, and the wiring setting on the array substrate 100 can be saved while increasing the storage capacitor.

Embodiment 6

Figure 8:
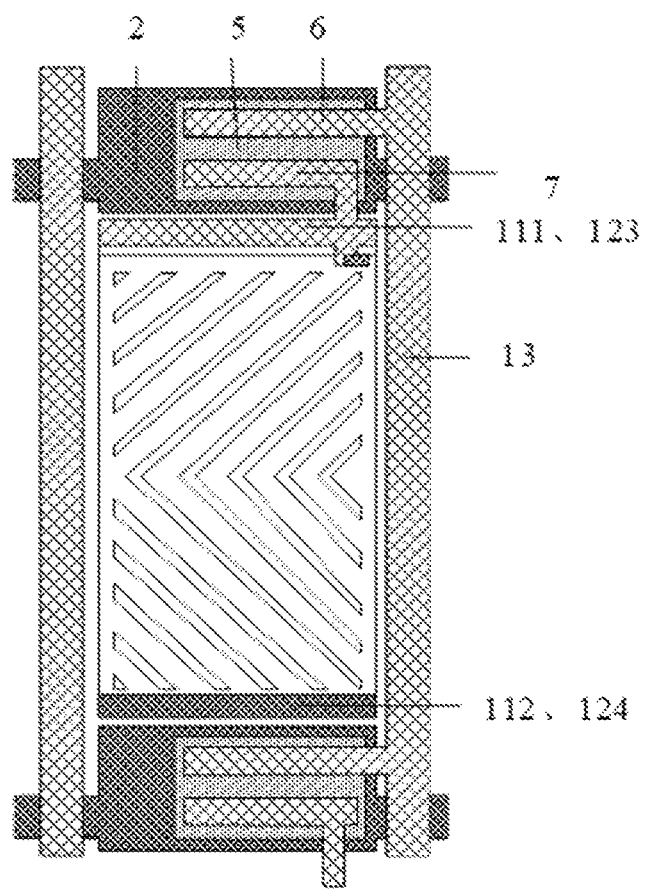
FIG. 8 is a partial schematic top view of an array substrate of embodiment 6 of the present disclosure.

The present embodiment provides an array substrate 100. FIG. 8 is a partial schematic top view of an array substrate 100 of embodiment 6 of the present disclosure.

As shown in FIG. 8, the first auxiliary electrode 11 includes a first electrode 111 and a second electrode 112, and the second auxiliary electrode 12 includes a third electrode 123 and a fourth electrode 124. The first electrode 111 and the third electrode 123 are arranged in the first gap region 21, the second electrode and the fourth electrode are arranged in the second gap region 22, the third auxiliary electrode 123 is arranged in the same layer as and directly connected to the source and drain electrode 7, and the fourth auxiliary electrode 124 is arranged in the same layer as and directly connected to the pixel electrode 9.

The present embodiment differs from embodiment 1 in that the first auxiliary electrode 11 and the second auxiliary electrode 12 are arranged at the first gap region 21 and the second gap region 22 at the same time, and the first auxiliary electrode 11 and the second auxiliary electrode respectively form a first auxiliary storage capacitor and a second auxiliary storage capacitor in the first gap region 21 and the second gap region 22, further increasing the total storage capacitor can better improve the poor display problem.

Embodiment 7

Figure 9:
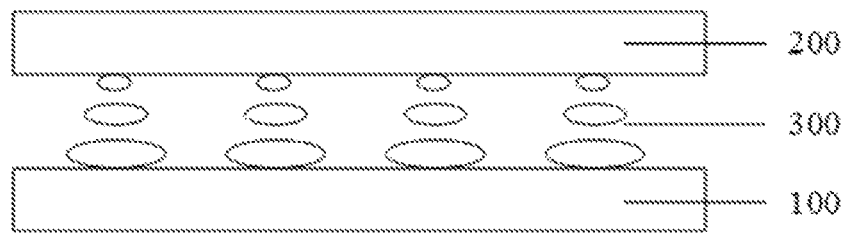
FIG. 9 is a schematic diagram of a display device of embodiment 7 of the present disclosure.

The present embodiment provides a display device. FIG. 9 is a schematic diagram of a display device of the embodiment of the present disclosure. The display device is a liquid crystal display device, including the above-mentioned array substrate 100. The display device further includes a counter substrate 200 arranged opposite to the above-mentioned array substrate 100, and a liquid crystal 300 arranged between the array substrate 100 and the counter substrate 200.

It should be noted that the above description is only specific embodiments of the present disclosure, but the protection range of the present disclosure is not limited thereto, and any changes or substitutions which can be easily conceived by a person skilled in the art who is familiar with the present technical field within the technical range disclosed in the present disclosure should be included in the protection range of the present disclosure.

What is claimed is:

1. An array substrate, comprising:
a base substrate;
a plurality of data lines extending along a first direction and a plurality of gate lines extending along a second direction, and a plurality of pixel units defined by the gate lines and the data lines;
wherein a pixel unit comprises a thin-film transistor, a common electrode and a pixel electrode, and the thin-film transistor comprises a gate electrode, a source and drain electrode and an active layer, wherein the pixel electrode and an adjacent gate line thereof have a gap region in the first direction;
the pixel unit further comprises a first auxiliary electrode and a second auxiliary electrode, wherein the first auxiliary electrode is electrically connected to the common electrode, and the second auxiliary electrode is electrically connected to the source and drain electrode; wherein
an orthographic projection of the first auxiliary electrode on the base substrate at least partially overlaps an orthographic projection of the second auxiliary electrode on the base substrate, and the first auxiliary electrode is located within the gap region;
wherein a length of the first auxiliary electrode and the second auxiliary electrode in the second direction is equal to a length of the pixel electrode in the second direction;
wherein a length of the first auxiliary electrode in the first direction is greater than one-third of a length of the gate line in the first direction and less than one-half of the length of the gate line in the first direction.

2. The array substrate of claim 1, wherein the pixel unit has a non-opening region and an opening region, and the gap region is located within the non-opening region.

3. The array substrate of claim 1, wherein the first auxiliary electrode is a metal electrode and is co-layered with the gate electrode.

4. The array substrate of claim 1, wherein the first auxiliary electrode and an adjacent gate line thereof have a first interval in the first direction;
the first auxiliary electrode and an adjacent pixel electrode thereof have a second interval in the first direction; and
the first interval is greater than the second interval.

5. The array substrate of claim 1, wherein the array substrate further comprises a gate insulating layer and a passivation layer;
the gate electrode is arranged on the base substrate;
the gate insulating layer is arranged on a side of the gate electrode away from the base substrate;
the active layer is arranged on a side of the gate insulating layer away from the base substrate;
the source and drain electrode is arranged on a side of the active layer away from the base substrate;
the passivation layer is located on a side of the source and drain electrode away from the base substrate; and
the common electrode is arranged on the base substrate and the pixel electrode is arranged on a side of the passivation layer away from the base substrate.

6. The array substrate of claim 1, wherein the array substrate further comprises a gate insulating layer and a passivation layer;
the gate electrode is arranged on the base substrate;
the gate insulating layer is arranged on a side of the gate electrode away from the base substrate;
the active layer is arranged on a side of the gate insulating layer away from the base substrate;
the source and drain electrode is arranged on a side of the active layer away from the base substrate;
the passivation layer is located on a side of the source and drain electrode away from the base substrate; and
the pixel electrode is arranged on the base substrate and the common electrode is arranged on a side of the passivation layer away from the base substrate.

7. The array substrate of claim 1, wherein the array substrate further comprises a gate insulating layer and a passivation layer;
the gate electrode is arranged on the base substrate;
the gate insulating layer is arranged on a side of the gate electrode away from the base substrate;
the active layer is arranged on a side of the gate insulating layer away from the base substrate;
the source and drain electrode is arranged on a side of the active layer away from the base substrate;
the passivation layer is located on a side of the source and drain electrode away from the base substrate; and
the pixel electrode is arranged on the side of the gate insulating layer away from the base substrate and the common electrode is arranged on a side of the passivation layer away from the base substrate.

8. The array substrate of claim 1, wherein the gap region comprises a first gap region and a second gap region;
a gap region of the pixel electrode and the gate line of the thin-film transistor electrically connected thereto in the first direction is the first gap region; and
a gap region of the pixel electrode and the gate line of the next row of the pixel unit in the first direction is the second gap region.

9. The array substrate of claim 8, wherein the first auxiliary electrode is arranged in the first gap region, and the second auxiliary electrode is co-layered with the source and drain electrode and is directly connected to the source and drain electrode.

10. The array substrate of claim 8, wherein the first auxiliary electrode is arranged in the second gap region, and the second auxiliary electrode is co-layered with the pixel electrode and is directly connected to the pixel electrode.

11. The array substrate of claim 10, wherein the array substrate further comprises a gate insulating layer and a passivation layer;
the gate electrode is arranged on the base substrate;
the gate insulating layer is arranged on a side of the gate electrode away from the base substrate;
the active layer is arranged on a side of the gate insulating layer away from the base substrate;
the source and drain electrode is arranged on a side of the active layer away from the base substrate;
the passivation layer is located on a side of the source and drain electrode away from the base substrate; and
the common electrode is arranged on the base substrate and the pixel electrode is arranged on a side of the passivation layer away from the base substrate.

12. The array substrate of claim 10, wherein the array substrate further comprises a gate insulating layer and a passivation layer;
the gate electrode is arranged on the base substrate;
the gate insulating layer is arranged on a side of the gate electrode away from the base substrate;
the active layer is arranged on a side of the gate insulating layer away from the base substrate;
the source and drain electrode is arranged on a side of the active layer away from the base substrate;
the passivation layer is located on a side of the source and drain electrode away from the base substrate; and the pixel electrode is arranged on the side of the gate insulating layer away from the base substrate and the common electrode is arranged on a side of the passivation layer away from the base substrate.

13. The array substrate of claim 8, wherein the first auxiliary electrode comprises a first electrode and a second electrode, the second auxiliary electrode comprises a third electrode and a fourth electrode, the first electrode and the third electrode are arranged in the first gap region, and the second electrode and the fourth electrode are arranged in the second gap region.

14. A display device comprising the array substrate of claim 1, wherein the display device further comprises a counter substrate arranged opposite the array substrate and a liquid crystal arranged between the array substrate and the counter substrate.

* * * * *